(12) United States Patent
Ganoung (10) Patent No.: US 6,860,252 B1
(45) Date of Patent: Mar. 1, 2005

(54) INTERNAL COMBUSTION ENGINES

(76) Inventor: David P. Ganoung, 2800 ½ Candelaria, Albuquerque, NM (US) 87107-2915

( * ) Notice: Subject to any disclaimer, the term of this patent is extended or adjusted under 35 U.S.C. 154(b) by 0 days.

(21) Appl. No.: 10/889,603

(22) Filed: Jul. 12, 2004

Related U.S. Application Data (60) Provisional application No. 60/489,675, filed on Jul. 24, 2003.

(51) Int. Cl.[7] ................................................ F02B 31/00
(52) U.S. Cl. ...................... 123/308; 123/302; 123/193.3
(58) Field of Search .................................. 123/302, 306, 123/308, 568.14, 90.15, 193.3

(56) References Cited

U.S. PATENT DOCUMENTS

| | | | | |
|---|---|---|---|---|
| 1,341,227 A | * | 5/1920 | Diamond ............. | 123/41.82 R |
| 1,496,396 A | * | 6/1924 | Vincent ................... | 123/188.7 |
| 1,775,358 A | * | 9/1930 | Smith ......................... | 428/567 |
| 2,250,446 A | * | 7/1941 | Cowles ....................... | 137/338 |
| 4,883,030 A | * | 11/1989 | Tanahashi et al. ....... | 123/193.3 |
| 5,050,557 A | * | 9/1991 | Ishida et al. ................ | 123/432 |
| 5,125,375 A | * | 6/1992 | Vuk ......................... | 123/193.5 |
| 5,165,374 A | * | 11/1992 | Chapman et al. ........... | 123/308 |
| 5,230,310 A | * | 7/1993 | Hashimoto ............... | 123/188.8 |
| 5,553,580 A | * | 9/1996 | Ganoung ..................... | 123/308 |
| 5,709,183 A | * | 1/1998 | Macfarlane et al. ..... | 123/193.3 |
| 5,950,582 A | * | 9/1999 | Stein ....................... | 123/90.15 |
| 6,612,285 B2 | * | 9/2003 | Ganoung ..................... | 123/308 |
| 6,640,780 B2 | * | 11/2003 | Blair ........................... | 123/432 |

* cited by examiner

Primary Examiner—Hai Huynh (57) ABSTRACT

A novel combustion chamber configuration locates the stems of all four of its valves in a parallel with the axis of the engine cylinder closed by the chamber. In this variation which is especially well suited for a barrel-stratified mode of engine operation, the spark plug can readily be offset a moderate distance from the axis of the cylinder into the fueled side of the combustion chamber because the pair of intake valves is separated from the pair of exhaust valves by an extra amount. The associated overlapping of the intake valve faces outside of a projection of the cylinder bore is utilized to form two symmetric flow masks which in turn function as the primary means for generating strong barrel swirl during the intake stroke.

27 Claims, 3 Drawing Sheets

INTERNAL COMBUSTION ENGINES

CROSS REFERENCE TO RELATED APPLICATIONS

The present application claims the benefit of the Jul. 24, 2003 filing date of U.S. Provisional Patent Application No. 60/489,675, entitled "Internal Combustion Engines."

BACKGROUND OF THE INVENTION

This invention relates to four-stroke spark-ignition engines in which a tumbling motion is imparted to the intake charge during its induction into the engine cylinder, and in preferred variations, it relates to such engines as adapted for stratified charge operation.

The pentroof style of combustion chamber is often designed to include two poppet type of intake valves located on one side of the pentroof in positions symmetric with respect to a central plane passing through the geometric axis of the associated engine cylinder. It has long been known that such a configuration facilitates the generation during the intake stroke of a vortex swirling about an axis perpendicular to the geometric axis of the cylinder. If the individual induction flow rates through the two intake valves are carefully balanced by means such as a continuation of the symmetry over the entire length of the two individual intake tracts, then the charge vortex will consist of siamese barrel swirl layers which also conform to the symmetry. As a result, the plane of symmetry will also be a boundary which defines flow separation between the two barrel swirl layers delivered through the two intake valves.

As the associated piston advances toward the pentroof chamber during its compression stroke, the two barrel swirl layers will experience radical alteration in shape, eventually becoming two flattened, but still symmetric and thus unmixed, flow-vortices with their now individual axes of rotation positioned nearly in parallel with the geometric axis of the engine cylinder. Mitsubishi engineers have verified that this breaking apart of the bulk charge motion into two mirror-image halves persists nearly until top dead center, where the charge motion is converted into large scale eddies. Not only does the verification of essentially no mixing across the plane of symmetry include computer modelling using computational fluid dynamics, but also empirical data obtained using a two-color laser sheet method as applied to a motored engine with optical access (described in SAE paper 920678). Most emphatically, this persistent separation of charge motion virtually guarantees a problem with air utilization at high BMEP (brake mean effective pressure) if fuel is always metered into only one of the two intake passages to thereby implement a fully barrel-stratified mode of engine operation.

While it is obvious that a less rudimentary fuel metering system can easily avoid the high-BMEP air utilization problem (excessive particulate matter, etc.) by allowing the two barrel swirl layers to have independently selected air-fuel ratio values; that is not the approach that has been taken either in barrel stratified engines mass produced for passenger cars, or apparently in any prototype engine that has actually been built and tested. What has resulted from this reluctance to include the necessary fuel metering capabilities is a failure to promote and preserve the stratification, most likely to the extent that the true potential of the barrel stratified charge engine remains obscure. In other words, design carelessness and even intentional degradation of the desirable in cylinder flow separation have typified previous research and development experience with barrel stratification. Such failures likely rule out successful implementation of features compulsory for barrel stratification to make spark ignition engine performance competitive with the fuel efficiency achieved by turbocharged Diesel engines which are drastically more costly to mass produce than barrel stratified engines with the requisite fuel metering capabilities.

My U.S. Pat. No. 6,612,285 discloses how the classic four-valve pentroof combustion chamber can be adapted to accommodate both barrel-stratified and homogeneous-charge modes of engine operation in order to significantly close the fuel efficiency gap separating Diesel engines from much less costly spark ignition engines. In more detail of this prior disclosure, the fully barrel stratified charge mode of engine operation becomes activated when fuel is in effect completely missing from a segregated half of the stoichiometric intake charge filling each engine cylinder at the conclusion of the intake stroke of the associated piston. Since the associated multi-cylinder engine would include features devised to promote and preserve the charge stratification to the full extent practical, consistent spark ignition can be achieved at wide open throttle in this very lean mode of engine operation. Not only that, but progressive addition of fuel to the originally unfueled barrel swirl layer (without increasing fuel metered to the originally fueled layer) will progressively increase BMEP in this wide open throttle regime until homogeneous charge operation is reached at a stoichiometric overall air-fuel ratio. To decrease BMEP while continuing to confine stoichiometric fueling to one barrel swirl layer will, in contrast, require use of the engine throttle valve. Well defined stratification at the time of ignition would assume even greater importance in this throttled regime of lower BMEP operation.

Another advantage conferred by really pronounced stratification of the two barrel swirl layers is that a spark plug originally in a central location need be offset only moderately into the always-fueled one of the two barrel swirl layers in order to provide excellent ignition performance in the barrel stratified mode of engine operation as well as in the homogeneous mode. However, the invention of my prior-art U.S. patent noted above employs two spark plugs per engine cylinder rather than just one moderately offset spark plug.

Like the present invention, some of the prototype barrel-stratified engines investigated by Ricardo Consulting Engineers utilized the simpler expedient of having just one spark plug in each engine cylinder. (Although the cost differential between turbodiesel and spark ignition engines would easily justify the more complex ignition system of my prior art invention, cost reduction always garners extra interest in the automotive industry.) Another feature of the present invention briefly considered in a basic way by Ricardo Consulting Engineers in their SAE paper 940482 is using intake-valve flow masks to generate tumble (the more common designation for barrel swirl, except when considering stratified charge engines) rather than geometric swirl. Nevertheless, Ricardo's flow mask configuration does not readily accommodate the moderately offset spark plug position favored by Ricardo's engineers as well as by the present invention.

One example in particular helps confirm that to appreciably narrow the fuel efficiency gap separating turbodiesel engines from much less costly port-injected engines could not have been a serious objective of any barrel stratified engine that has yet been tested. SAE paper 950165 documents that, in the development of a multi-cylinder research engine, a production passenger car engine was modified by using only a single fuel injector to serve just one of the two completely separate intake passages associated with each engine cylinder, and also by offsetting the single spark plug in each cylinder toward its fueled side. Also clearly documented is the fact that short and long intake passage lengths served each cylinder, with the specific purpose of reducing the degree of stratification as a way of providing air utilization acceptable for full-load engine operation. Just a few months prior to publication of this SAE paper, a different company introduced a spark-ignition V6 into high-volume automotive production with many of the same features used by the research engine, most notably a single fuel injector in just one of two unequal length intake passages per cylinder. The production engine, however, was not even considered to be a stratified charge engine and did not employ any offset of its spark plug position from the central location normal for the classic four-valve pentroof combustion chamber.

SUMMARY OF THE INVENTION

In light of the prior art related to reciprocating internal combustion engines, it is a primary objective of the present invention to provide a four-valve combustion chamber configuration which readily accommodates the two-layer type of barrel stratification by employing a single spark plug offset moderately from a central location.

It is another principal objective to provide a combustion chamber configuration which, when combined with intake-valve throttling, generates pronounced barrel swirl at low as well as high values of manifold absolute pressure.

It is another objective to employ masking of the engine intake valves in a combustion chamber configuration which inherently makes extra space available directly over the associated cylinder bore.

It is still another objective of the present invention to render port-injected spark-ignition engines competitive with the fuel efficiency of far more costly turbocharged Diesel engines.

These and other objectives can be achieved by first positioning the stems of all intake valves serving an engine cylinder in the cylinder head and in parallel with the geometric axis of the cylinder, and by next allowing the face area of each intake valve to overlap outside the bore area of the cylinder. The relief volume necessitated by this overlapping of areas closely shrouds a portion of the intake valve circumference to thereby impart a tumbling motion to the intake charge upon its induction into the cylinder. In a particularly preferred variation with two intake valves for each engine cylinder, stratified charge engine operation is facilitated by offsetting the spark plug moderately into an area made available by the novel intake valve positioning.

BRIEF DESCRIPTION OF THE DRAWING

The present invention is illustrated in the accompanying three figures of the drawing, in which.

DETAILED DESCRIPTION OF THE INVENTION

Figure 1:
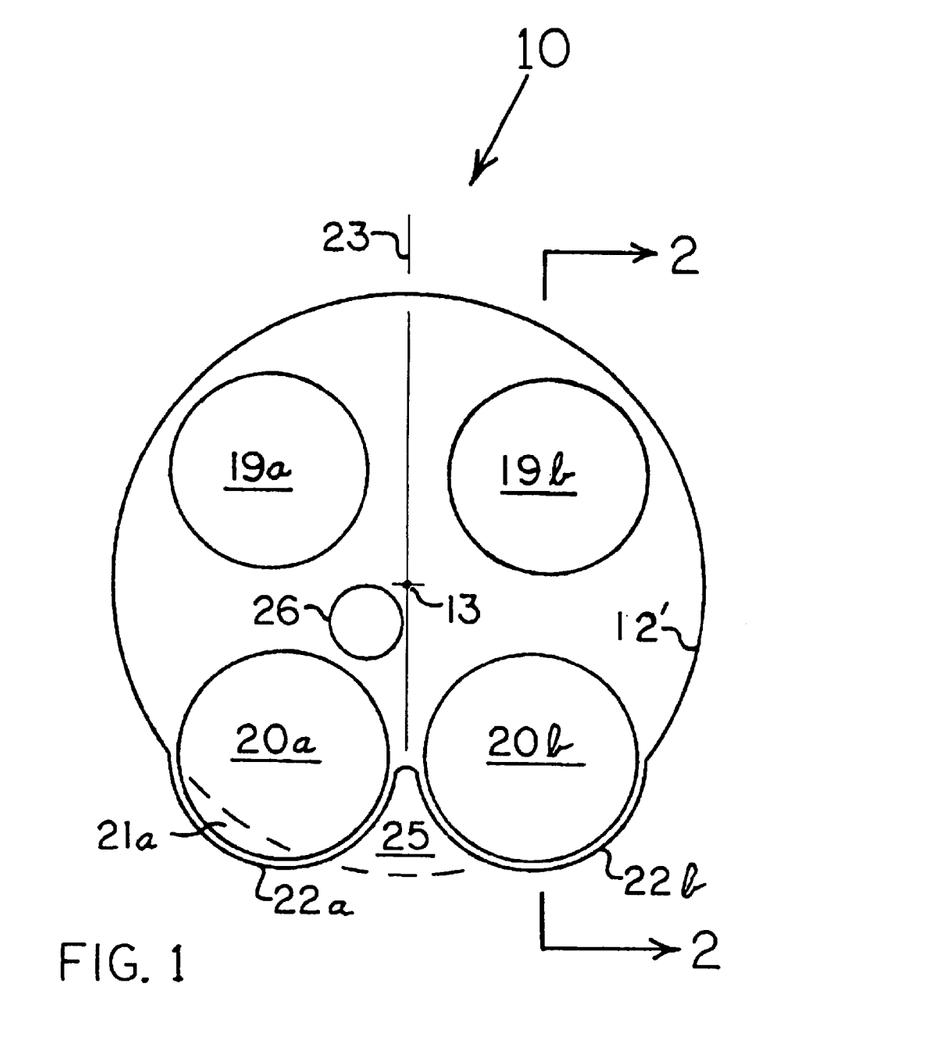
FIG. 1 represents a four-valve combustion chamber configuration according to the present invention.
Figure 2:
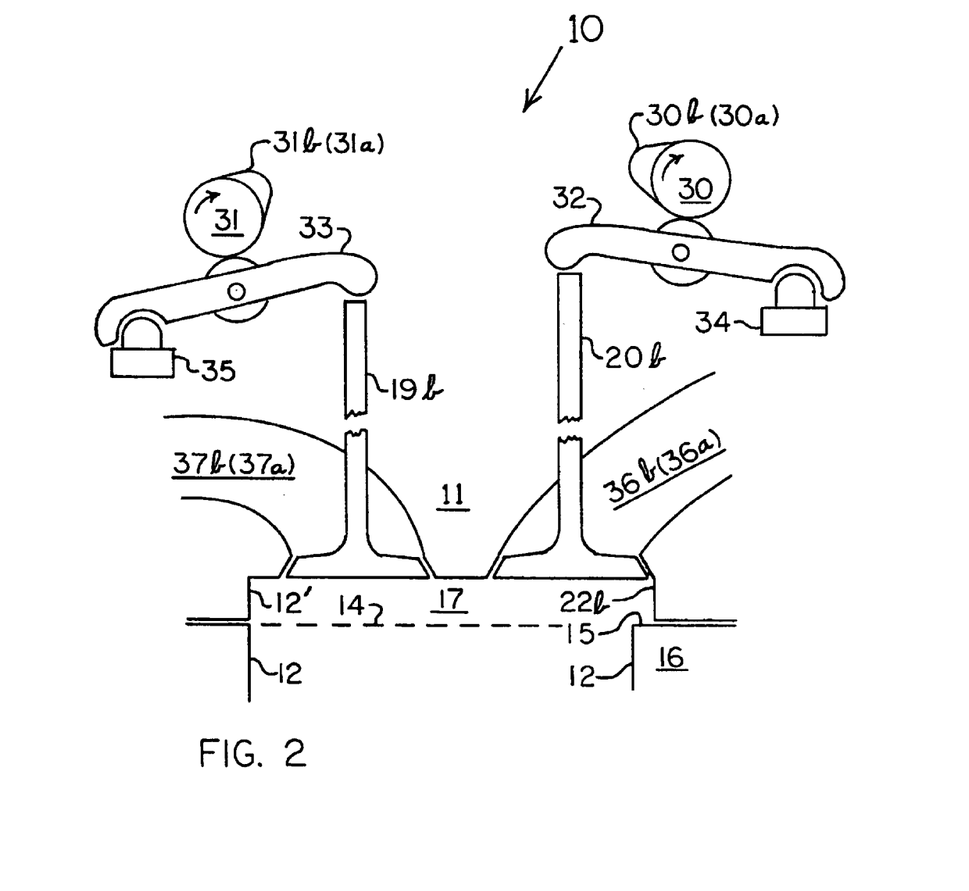
FIG. 2 illustrates one of the many alternatives available for actuating the intake and exhaust valves of the combustion chamber of FIG. 1.

FIG. 1 and FIG. 2 together illustrate features of a combustion system 10 which is intended for use in automotive and other internal combustion engines. FIG. 2 shows generally that, among other configurations for valve actuation, a double overhead camshaft (DOHC) arrangement utilizing finger-type camshaft followers may be employed in a cylinder head 11 within which many of the defining features of the present invention are embodied. FIG. 1 presents a view looking vertically up in FIG. 2 at the faces of the four poppet type of valves installed in this single-cylinder head portion 11, and FIG. 1 also reveals that FIG. 2 is in fact a sectional view 2—2 offset from the geometric axis 13 of the cylinder bore 12 to thus show the righthand ones of the pairs of intake and exhaust valves.

A flat-topped piston which reciprocates in the bore 12 of the cylinder closed by the head portion 11 is represented only by a dashed line 14 located even with the deck surface 15 of the engine block 16 within which the cylinder bore 12 is machined or otherwise formed. Thus the top surface of the piston 14 occupies the position indicated by the associated dashed line only when the piston 14 reaches its top dead center position as produced by an associated crankshaft and connecting rod which are not specifically shown. The combustion chamber volume 17 thereby formed in the cylinder head 11 is, in contrast to its associated variable cylinder volume, not scavenged by the piston 14.

With specific reference now to FIG. 1, the circular faces of the identical exhaust valves 19a and 19b reside completely within the circumference 12 prime, which is a projection of the actual cylinder bore 12 onto the plane of FIG. 1 and which also is, with some modification, the outline of the vertical wall portion of the combustion chamber 17 in parallel with the cylinder axis 13. Quite unlike the exhaust valves, however, the identical intake valves 20a and 20b require that generally crescent shaped relief volumes 21a and 21b be formed in the combustion chamber 17 to accommodate opening of the intake valves 20a and 20b. (Only the lefthand relief 21a is specifically delineated by its reference numeral and a dashed portion of the circumference 12 prime.) As a result of necessary clearance between the vertical walls of the combustion chamber 17 and the valves 20a and 20b, the approximately semicircular wall portions 22a and 22b of course have a slightly greater radius than that of the heads of the associated intake valves 20a and 20b.

These wall portions 22a and 22b extend beyond the actual relief volumes 21a and 21b to form the tongue of area 25 in order to more effectively shroud the valves 20a and 20b when they are open and thus mask these valves from supplying any significant velocity of combustion air flow other than in an upward direction as projected onto the plane of FIG. 1. Which is to say that the plane of symmetry 23 passing through the geometric axis 13 of the cylinder 12 will divide the cylinder 12 and combustion chamber 17 into fueled and unfueled (or partially fueled) barrel swirl layers if the combustion system 10 includes the preferred fuel metering and engine control features disclosed in my U.S. Pat. No. 6,612,285. Accordingly, this patent disclosure is incorporated herein by reference, including its description of how the combustion system 10 would encompass a nominally homogeneous-charge engine operating mode as well as barrel stratified engine operation. The location of the spark plug 26 offset moderately into the always fueled barrel swirl layer contained in the lefthand half of the cylinder 12 and combustion chamber 17, but still close enough to the plane 23 to afford a reasonable approximation of performance available from a central spark plug location, is made possible by the separation of the lefthand exhaust and intake valves 19a and 20a. This separation is in turn made possible by the very same overlapping of the intake valve face areas onto area outside of the cylinder bore 12 which is so compatible with the tumbling motion of the intake charge at the end of the intake stroke of the piston 14 as generated by the flow masks 22a and 22b. Tumble is of course an alternative terminology for designating barrel swirl.

Since the tongue of area 25 overlaps area within the circumference of the bore 12, it must not extend below the TDC piston position 14 and in fact can constitute a small squish area or not, depending on how closely it approaches the TOC piston position 14. As the full extent of lift of the intake valves 20a and 20b from their respective valve seats is preferably shrouded by the flow masks 22a and 22b, attaining a maximum compression ratio for a given bore/stroke ratio will require that the tongue of area 25 be a squish area, but as an alternative way of increasing the compression ratio, the piston 14 can employ a wide raised area on its top surface, preferably located between the tongue 25 and the exhaust valves 19a and 19b. In any case, the maximum lift of the intake valves 20a and 2bb is limited by the portions of the deck 15 exposed by the relief volumes 21a and 21b, and any raised portion of the piston 14 should be designed to preserve both the intensity of barrel swirl and the mirror-image symmetry with reference to the plane 23 of the bulk charge motion within the cylinder 12 and combustion chamber 17.

Although the double overhead camshaft arrangement shown is but one of many alternatives for actuating the four poppet valves in the combustion system 10, it does offer a convenient opportunity for independently varying the angular phasing of the intake camshaft 30 and of the exhaust camshaft 31 relative to the crankshaft in the associated engine. In addition, the intake-side cam follower 32 (engaging the valve 20b) and the exhaust-side follower 33 (engaging the valve 19b) exemplify all of the followers in contact with the overhead camshafts 30 and 31 to illustrate that the finger type of follower, when utilized as shown in FIG. 2, increases the separation between the camshafts to thereby make designing a practical camshaft drive system (not shown) more feasible. Thus, in addition to accommodating the close intake-to-exhaust spacing of the upper ends of the valve stems that results from having all four of the valve stems in'parallel with the associated cylinder axis 13, the finger type of follower readily adapts to automatic zero-lash adjustment of valve clearance without the disadvantage of added valvetrain mass. This last benefit is illustrated by the stationary hydraulic pivot 34 for the follower 32 and the hydraulic pivot 35 for the follower 33; the followers 32 and 33 include rollers in order to reduce valvetrain friction. The camshaft lobe 30a for actuating the intake valve 20a of the cylinder 12 is identical to the lobe 30b which contacts the roller of the follower 32, and this other intake lobe 30a is referenced in parentheses in FIG. 2 to emphasize this fact as well as the identical angular positioning of the lobes 30a and 30b on the camshaft 30. The exhaust valves 19a and 19b similarly operate in unison.

Finally in FIG. 2, the intake passage 36b serves its associated intake valve 20b and has mirror-image symmetry with passage 36a associated with the other intake valve 20a of the cylinder 12. As confirmed in the incorporated disclosure of U.S. Pat. No. 6,612,285, these twin intake passages 36a and 36b preferably retain their symmetry with respect to the plane 23 throughout their entire length as individual passages, regardless of whether the passage cross-section at any particular distance from the associated intake valves is contained in the head portion 11 or in another portion of the associated engine, such as a separate casting or plastic component incorporating a plenum together with what are commonly referred to as intake runners. While the exhaust passages 37a and 37b can also be mirror-image symmetric with respect to the plane 23, moderate asymmetry and early convergence of these exhaust passages should not unduly degrade the symmetry of fueled and unfueled barrel swirl layers which is so important for barrel-stratified operation of the combustion system 10. (Strictly speaking, the term, "port," would describe an actual opening into the combustion chamber 17, and not any portion of a passage leading all the way up to the opening itself. This more precise interpretation is adopted in the present disclosure in order to avoid any confusion arising from which engine component or casting might contain a particular portion of the intake passages 36a and 36b.)

In operation of an engine which would benefit from the combustion system 10 (quite possibly a multi-cylinder engine), the intake valve flow masks 22a and 22b will direct the flow of combustion air in the proper direction for generating tumble in the cylinder 12 as soon as the simultaneous opening of the twin intake valves 20a and 20b becomes large relative to the radial clearance between these valves and their associated flow masks 22a and 22b. Since I.C. engine intake valves typically begin opening well before the associated piston has descended a significant distance from its top dead center position, this radial clearance will not necessarily require anything close to a tight and therefore precise tolerance. Nevertheless, such tolerance might be readily available, for example if the flow mask can be machined to its final shape during an operation for machining a pocket into which the associated intake valve seat insert will be pressed. Moreover, the cylinder-block deck surfaces enclosing the lower part of relief volumes 21a and 21b will block flow-mask leakage flow from heading straight down the wall of the cylinder 12 over a significant portion of the masks 22a and 22b. This leakage flow will instead be redirected in at least an approximation of the correct direction for establishing tumble in the desired forward direction of rotation.

As the piston 14 begins to retreat a substantial distance from its top dead center position represented in FIG. 2, combustion air will be entering the cylinder 12 during the intake stroke in a flow direction roughly consistent with the orientation shown in FIG. 2 for the twin intake passages 36a and 36b. More from the perspective now of FIG. 1, this flow of intake air will be approximately equivalent to what would result from a hypothetical straight-line intake aperture equal in height to the valve lift and extending uninterrupted completely across the faces of both of the valves 20a and 20b through their centers. This assumption is made because the intake air flow directions as projected onto the plane of FIG. 1 will be largely normal to the line which would represent this hypothetical ribbon-like aperture in FIG. 1. As a consequence of the dominant flow direction across the combustion chamber 17 from the intake side to the exhaust side and angled more downward as the piston 14 moves farther away from top dead center, the effective flow velocity will remain high across the entire length of the hypothetical straight-line aperture. In fact, the minimal volume of the cylinder 12 directly outboard of this aperture implies that enlarging the size of the intake valves 20a and 20b beyond the size shown in FIG. 1 relative to the bore size shown would not significantly increase the ultimate power producing potential of the combustion system 10.

The analytical concept of an equivalent ribbon-like aperture for delivery of combustion air into an engine cylinder through one or more fully masked (that is, masked around essentially 180 degrees of the valve circumference) intake valves has special relevance to the present invention because it allows an interesting comparison to be made with another type of combustion system which, unlike the present invention, has been used in high-volume automotive production. For instance, SAE paper no. 961151 documents two separate instances in which a flow mask was applied to the single intake valve in each combustion chamber of a homogeneous charge type of engine to thus generate the type of bulk charge motion most common to two-valve combustion chamber configurations, that is, charge motion swirling about the geometric axis of the respective engine cylinder. (In one case the engine was a mass production design, and in the other it was one of several alternatives being evaluated for production.) With such an arrangement of a single, large intake valve fully masked to generate axial swirl, the intake flow velocity through the equivalent ribbon-like aperture will be roughly in proportion to the radial distance from the geometric axis of the engine cylinder because this aperture will be positioned on a radius of the cylinder. Which is to say that portions of the aperture residing only a small distance from the cylinder axis will have low flow velocity and thus contribute relatively little to overall intake air flow capacity. So not only should the entire length of the hypothetical flow aperture for the present invention avoid this sort of low efficiency, but the length of the aperture for FIG. 1 greatly exceeds the radius of the cylinder 12. This simple comparison leads directly to a prediction that the combustion system 10, even with the moderate intake valve size shown in FIG. 1, will have a displacement-specific power advantage over masked two-valve combustion chambers competitive with the same power advantage that the classic four-valve pentroof combustion chamber has.

Exactly like the present invention, the classic pentroof configuration must generate sufficient charge motion to enhance combustion, and this is accomplished more by using the design of the intake passages to direct flow out of the intake valves in the direction across the combustion chamber and toward the exhaust valves. In other words, the classic approach relies heavily on the design and orientation of the intake passages to direct combustion air from the half of each intake valve circumference which faces across the pentroof chamber toward its respective exhaust valve to thereby generate barrel swirl. Since the other half of the intake valve circumference is thus rendered largely ineffective from the standpoint of ultimate engine breathing capacity, the classic approach would be expected to have no substantial advantage in comparison to using flow masks to accomplish this same purpose.

What the foregoing theoretical considerations fail to recognize, however, is that induction of air-fuel charge into the engine cylinder can continue during the period after the piston passes bottom dead center, but before the associated intake valves have closed completely. The extra flow restriction due to the low lift of the intake valves at this time tends to distribute flow through a greater than 180 degree portion of the circumference of an unshrouded intake valve, regardless of its having an associated intake passage designed to direct induction flow toward the exhaust-valve side of the engine cylinder. This inherent activation of a greater portion of the valve circumference at low values of lift would certainly seem to favor the essentially unshrouded intake valves in a conventional pentroof combustion chamber. At the same time, several other factors would alleviate this apparent deficiency of the present invention with respect to volumetric efficiency.

First, the intake valves 20a and 20b in FIG. 1 could easily be spread further apart from each other in conjunction with deletion of the tongue 25, to thereby greatly increase the percentage of intake valve circumference which is effective at lower values of valve lift. Another factor is simply to realize that the objectives of the present invention do not include being fully competitive on the basis of specific power output (as for racing engines) with the conventional pentroof style of combustion chamber. In contrast, the present invention focuses on fuel efficiency, and a moderately larger piston displacement could therefore be exploited to provide undiminished maximum power output without nullifying the efficiency advantage of the present invention to a significant extent. In any case, engines designed to power passenger cars and light trucks rarely have valve timing which strongly accentuates the induction of air-fuel mixture after the piston passes BDC.

A more speculative consideration related to volumetric efficiency concerns the fact that the flow masks 22a and 22b suppress undesirable flow when the intake valves 20a and 20b are at lower values of lift during opening as well as during closing. More specifically, flow down the intake-valve side of the cylinder wall or liner inhibits formation of tumble in the desired forward direction as established by flow down the exhaust-valve side of the liner. Since the areas of the deck 15 exposed by the relief volumes 22a and 22b help block the counterproductive intake-side flow, relatively less vigorous exhaust-side flow should suffice. Consequently, the intake passage velocity needed in the conventional pentroof configuration might be unnecessarily high in the sense that it must offset the counterproductive flow experienced at low valve lift. Generating such extra induction velocity would of course entail at least some added restriction which would in turn negatively affect volumetric efficiency of the conventional pentroof configuration in comparison to the present invention. Elimination or reduction of the undesirable flow down the intake-valve side of the cylinder liner has special importance if the intake valves 20a and 20b are to be actuated by the general type of system which makes an engine throttle valve unnecessary, rather than by the simpler fixed-valve-lift layout represented in FIG. 2.

The general type of variable valve actuation (VVA) Just mentioned has well known engine performance benefits, and these benefits can be expanded by the present invention. To begin, this specific operational type of VVA will be referred to herein as "throttleless VVA" in recognition of the fact that a quite diverse array of different mechanical assemblages will yield full control of engine air consumption without a throttle valve. U.S. Pat. No. 5,937,809 discloses one such assemblage which would readily adapt to the double overhead cam layout of FIG. 2, and this patent disclosure is therefore incorporated herein by reference. In particular, FIG. 6 of this disclosure verifies that a pair of finger type of cam followers can be activated by the intake camshaft in a DOHC arrangement, but only one cam lobe is employed to activate each pair of intake valves in unison.

While throttleless VVA systems have been promoted as completely eliminating engine throttle losses, this is not generally true. In fact, at least some throttling occurs at the intake valve itself, and such throttling is the source of advantageous synergism between throttleless VVA and the present invention. In more detail, lift of the intake valves 20a and 20b must be severely attenuated if combustion air flow into the cylinder 12 and combustion chamber 17 is to be reduced to an amount appropriate for idling of the associated engine. If the radial clearance between the valves 20a and 20b and their respective flow masks 22a and 22b is at least moderately small compared to such highly attenuated values of valve lift, then the masks 22a and 22b will still perform their intended function of generating a substantial amount of barrel swirl in two mirror-image layers. The fully barrel stratified charge mode preferred for low and even zero BMEP (brake mean effective pressure) engine operation according to the present invention will increase cylinder intake flow and thus reduce the required attenuation of valve lift. This result will in turn moderate how closely and precisely the masks 22a and 22b must shroud their respective valves 20a and 20b in order to be effective in generating the barrel swirl which makes fully stratified operation at low BMEP possible in the first place. (Two factors contribute to regulation of intake charge density when a throttleless VVA system is employed. As exemplified in FIG. 12 of the incorporated '809 patent, a particular VVA system may have an inherent characteristic of closing the intake valve extremely early when peak lift is adjusted to a very low magnitude. If this early intake valve closing excessively dominates the other contributor to intake flow regulation, which is the intake valve throttling essential to the present invention for generating barrel swirl at low BMEP and RPM, then a variable phasing mechanism for the intake camshaft can be incorporated to appropriately modify the inherent VVA characteristic.)

In contrast to the present invention, the classic pentroof type of four-valve combustion chamber cannot easily develop barrel swirl energetic enough at low BMEP and low crankshaft speed to support barrel stratified combustion. The low velocity in the intake passages under such engine operating conditions renders the orientation and design of these passages ineffective in directing intake flow out of the proper half of the intake valve circumference. Instead, intake flow will jet from the entire valve circumference when the intake valve throttling effect of a throttleless VVA system is enabled.

Figure 3:
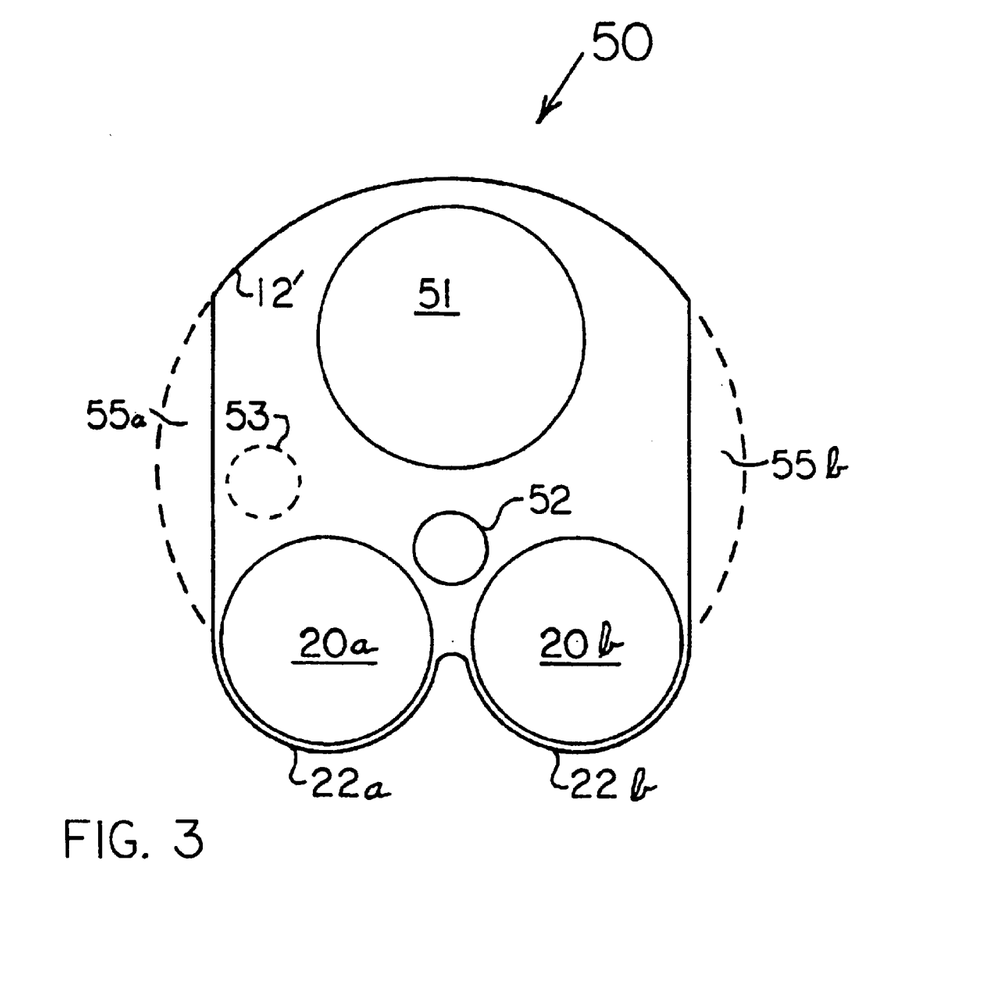
FIG. 3 shows a three-valve combustion chamber configuration according to the present invention.

While modification of the embodiment of FIG. 2 to include a throttleless VVA system would obviously increase the manufacturing cost of an engine utilizing the present invention, it is also true that the barrel stratified combustion which is preferred but not absolutely essential for the present invention need not cover the full range of engine operation extending all the way to conditions such as engine idle. As implied in the incorporated disclosure of my U.S. Pat. No. 6,612,285, the barrel swirl layer which envelops the spark plug 26 in FIG. 1 at the end of the intake stroke can be fueled beyond stoichiometric as compensation for excessive migration of fuel to the nominally unfueled barrel swirl layer, such migration being aggravated by insufficient intensity of barrel swirl. Compatible with the general objective of limiting engine mass production cost without at the same time precipitating a commensurate degradation in engine performance, FIG. 3 shows a combustion system 50 derived directly from the embodiment of FIGS. 1 and 2. Wherever an identical reference numeral is transferred to FIG. 3 from the previous FIGS. of the drawing, the component identified by that numeral is also unchanged from the previous description. In particular, the twin intake valves 20a and 20b along with their respective flow masks 22a and 22b still function in the variation represented in FIG. 3 to produce two mirror-image symmetric layers of barrel swirl.

Rather than the pair of identical exhaust valves 19a and 19b specified with reference to FIG. 1 and FIG. 2, the modified combustion chamber architecture of FIG. 3 would employ a large single exhaust valve 51 positioned as shown to preserve the symmetry of valve placement with reference to the plane 23 in FIG. 1, which is also the theoretical boundary. plane separating the two barrel swirl layers. This three-valve architecture, still with all the valve stems parallel to the geometric axis of the associated engine cylinder, can reduce manufacturing cost beyond what is directly evident in FIG. 3. More specifically, a single overhead camshaft can actuate all three of the poppet valves used in one cylinder of the combustion system 50 if the three associated finger followers are oriented so that their rollers are aligned between the intake and exhaust valve stems. This orientation would, for example, locate the stationary zero-lash pivots for the intake valves 20a and 20b roughly in positions flanking the stem of the single exhaust valve 51.

Even though simplifying the engine fuel metering system of the combustion system 50 by deleting the capability for barrel stratified engine operation would reduce engine manufacturing cost, this cost saving is not generally considered to be justified as entailing only an acceptable loss of engine performance, which is fuel efficiency in this case. Nevertheless, the spark plug 52 is shown centered, on what would be the theoretical boundary plane for charge stratification, in order to emphasize that the present invention has utility as a strictly homogeneous charge combustion system. This utility includes turbulence enhanced combustion and the capability for relatively high specific power output in a relatively low cost engine.

The auxiliary spark plug 53, shown dashed in FIG. 3, enables the option of implementing barrel stratified engine operation via the staggered firing of two spark plugs as disclosed in the incorporated U.S. Pat. No. 6,612,285. Offsetting the original spark plug 52 as exemplified by the spark plug 26 in FIG. 1 provides a lower cost option for implementing barrel stratified combustion, but larger intake-to-exhaust valve separation than shown in FIG. 3 would be appropriate for this lower cost option. More separation would in turn necessitate larger relief volumes for the intake valves 20a and 20b if the large size of the exhaust valve 51 is to be preserved.

Although not usually a preferred approach, the present invention can employ only one intake valve and only one exhaust valve per cylinder of the associated engine. One particular advantage, however, of a two-valve architecture is, that the squish areas corresponding to the squish areas 55a and 55b in FIG. 3 can be made to cover a much larger portion of the bore area than in FIG. 3. Squish area can in turn compensate to some extent for low intensity of barrel swirl at light load and low RPM if enhancement via throttleless VVA or a tumble control valve apparatus is not to be included in the design of the associated engine. If, on the other hand, the added cost of such adjustable turbulence enhancement is acceptable, it is preferred that squish area be held to a minimum, as exemplified in FIG. 1.

In a two-valve combustion chamber not shown in the drawing) which utilizes a relief volume for its single intake valve, an intake valve diameter equal to 50% of cylinder bore diameter can easily be combined with an exhaust valve diameter of about 44% of bore diameter. As before, all valve stems would be parallel to the geometric axis of the associated cylinder, flow masking would encompass at least the relief volume to generate barrel swirl, and barrel stratification would be an option but would require an intake passage divider. A single overhead camshaft could directly actuate all intake valves as lined up in a bank of engine cylinders, with a short pushrod extending across to the exhaust side of the cylinder head and engaging a compound rocker element for each exhaust valve. A rocker shaft for these rocker elements would be mounted outboard of the line of exhaust valve stems in the associated cylinder head and would thus provide the support necessary for each rocker element to include two axially offset fingers. One of the fingers would actuate its associated exhaust valve, and the other could employ enough axial offset to accommodate a pushrod location centered between adjacent cylinders. When extended for application to the three-valve architecture of FIG. 3, this alternative SOHC valve actuation scheme would enhance spark plug access. Although the DOHC arrangement of FIG. 2 already provides ample access to the combustion chamber 17 for spark plug location, the SOHC approach as just summarized can include either an extra exhaust-valve finger on each compound rocker or two compound rocker elements per engine cylinder for actuating the two exhaust valves in FIG. 1.

Some deviations from the embodiments currently envisioned as being the absolute best modes of practicing the present invention have already been mentioned, in no small part to emphasize that the appended claims should not be limited to the specific features disclosed for the best modes. Even so, all modes encompassed by these claims are believed to posses utility beyond that of the prior art, and time or practical experience can change the inventor's opinion of the relative merits of alternative modes for practicing the invention. Accordingly, a few more of the currently less than preferred alternatives will now be summarized.

First, the alternative of applying staggered spark timing to two spark plugs in order to implement barrel stratified combustion can be employed in the four-valve architecture of FIG. 1 as well as in the three-valve architecture of FIG. 3. If this is done, there will be less need for separation vertically on the plane of FIG. 1 between the pair of intake valves and the pair of exhaust valves. In fact, the flow masks 22a and 22b could still be fully semi-circular as formed in the cylinder head 11 even if the intake valves 20a and 20b were moved upward on the plane of FIG. 1 just enough to completely eliminate the relief volumes 21a and 21b. Not only would the area 25 then become larger to maintain the full flow shrouding effect, but small areas outboard of the area 25 would have to be added as shrouding.

Another alternative again concerns removing the reliefs 21a and 21b from the cylinder head 11, but in this case these reliefs are to be machined into the deck 15 of the associated cylinder block so that the top surface of the combustion chamber 17 can be machined flat integrally with the flat head gasket sealing surface of the head 11. Since this alternative would eliminate the portion of the masks 22a and 22b produced by the tongue of area 25, it might not always be acceptable. Making the relief volumes larger, by further separating the intake valves from the exhaust valves, would reduce the amount of flow masking lost to this alternative manufacturing approach. In any case, the deck height of the cylinder block would of course be greater for this alternative.

As another example alternative, the exhaust valve stem or stems could easily diverge quite radically from vertical because these valves are not shrouded by flow masking. If, for instance, the stem of the single exhaust valve 51 in FIG. 3 were to be splayed away from the associated intake valve stems, then a "ramphead" combustion chamber would be the result. A potential, but probably tenuous, advantage of a ramphead configuration is that the intake flow would inherently be ramped downward before encountering the cylinder wall on the exhaust side. Lower manufacturing cost would, in contrast, certainly seem to favor orienting the stem of every poppet valve in parallel with the geometric axis of its associated cylinder. Even so, the top of the four-valve combustion chamber 17 can be ramped downward fairly steeply only in the area between the pair of intake valves and the pair of exhaust valves so that the stems of all four valves would remain vertical in FIGS. 1 and 2. The resulting placement of the faces of the pair of closed exhaust valves on a lower level than the faces of the pair of closed intakes would enable an increase in compression ratio without relinquishing the advantage of a flat piston top. At the same time, free-spin clearance for the exhaust valves would likely be lost.

As yet another example, the stems of three vertical intake valves (per cylinder) could be positioned in a straight line in a five-valve combustion chamber according to the present invention. While definitely not preferred for use in conjunction with the two-layer type of barrel stratification, this approach might have application in engine designs which place a premium on high specific power output, or in engines where three-layer barrel stratification would be acceptable.

As the last example illustrating the scope and breadth of the following claims, the present invention might benefit direct injection gasoline engines by making more space available in the cylinder head area located directly over the cylinder bore. In any type of engine, this liberated space can be exploited to mitigate transfer of heat from the exhaust side of the cylinder head to the intake ports and their adjoining passage sections on the other side, thereby enhancing power output. In conjunction with a large bore-to-stroke ratio, this advantage might facilitate the design of high specific power output engines having uncommonly good efficiency.

What is claimed is:

1. A combustion system for a four-stroke internal combustion engine having at least one cylinder and a piston which reciprocates therein, comprising:

two substantially identically sized poppet type intake valves actuated in unison to thereby admit combustion air into the one cylinder, a cylinder head portion for (a) closing an end of the one cylinder, (b) guiding a stem portion of each of said two intake valves in a direction of valve opening and closing travel substantially parallel to the direction of the geometric axis of the one cylinder and (c) supporting an individual seating surface for a head portion of each of said two intake valves to seal against in a closed position which maintains gaseous pressure on the piston during compression and power strokes of the piston in the one cylinder, said two intake valve seats being located substantially adjacent each other in said cylinder head, an individual passage for supplying combustion air to each of said two intake valves, the combination of one of said intake valves and its associated one of said intake passages being substantially mirror-image symmetric with a combination of the other of said intake valves and the other of said intake passages, said symmetry being with respect to a plane which passes through the geometric axis of the one engine cylinder, each of said two valve head portions having an outer circumference which overlaps area outside the circumference of the bore of the one cylinder when all three of said circumferences are generated as projections onto a plane normal to the geometric axis of the one cylinder, said overlapping area of each of said intake valve heads being less than half of its total circumference area, whereby each of said two intake valves opens into a combustion chamber formed at said closed end of the one cylinder, and for each of said two intake valves an individual relief volume contained in said combustion chamber to accommodate said overlapping valve head area when in a fully open position, each of said two relief volumes being contoured to comprise at least a portion of a flow mask shrouding its respective one of said intake valves, said two masks together functioning in conjunction with simultaneous opening of said two intake valves to direct combustion air-generally across the bore of the one cylinder from said valves and parallel to said plane of symmetry to thereby generate barrel swirl in two symmetric layers of combustion air, one supplied from each of said two intake passages during an intake stroke of the piston, whereby said relief volumes of said combustion chamber allow location of said head portions of said two intake valves in positions which liberate space in said combustion chamber directly over the bore area of the one cylinder.

2. The combustion system of claim 1 wherein a barrel stratified charge mode of operation of the engine is made available by features of the combustion system comprising:

means for metering fuel individually into combustion air supplied separately through said two intake passages and in so doing for selectively providing a richer air-fuel ratio in a first of said two barrel swirl layers than in a second of said two barrel swirl layers, and a spark ignition source offset from said plane of symmetry into said first barrel swirl layer.

3. The combustion system of claim 2 wherein each of said two flow masks shrouds substantially half of the head circumference of its respective one of said two intake valves.

4. The combustion system of claim 2 further comprising (a) a second spark ignition source positioned in said combustion chamber substantially on said plane of symmetry and (b) ignition means effective to activate said second ignition source only after a beginning phase of combustion as initiated by prior activation of said first mentioned ignition source has caused said richer barrel swirl layer to expand sufficiently to envelop spark electrodes of said said second ignition source.

5. The combustion system of claim 1 further comprising one and only one poppet type exhaust valve, a stem portion of which is guided by said cylinder head in a direction of valve opening and closing travel substantially parallel to the direction of the geometric axis of the one cylinder, a head portion of said exhaust valve having an outer circumference which lies completely within said cylinder circumference when said exhaust valve circumference is generated as a projection on said plane of said cylinder circumference.

6. The combustion system of claim 5, wherein each of said two flow masks shrouds substantially half of the head circumference of its respective one of said two intake valves.

7. The combustion system of claim 1 further comprising one and only one poppet type exhaust valve located in said combustion chamber on each side of said plane of symmetry with a stem portion of each of said two exhaust valves being guided by said cylinder head.

8. The combustion system of claim 7, wherein the direction of opening and closing travel for each of said two exhaust valves is substantially parallel to the geometric axis of the one cylinder.

9. The combustion system of claim 7 wherein each of said two flow masks shrouds substantially half of the head circumference of its respective one of said two intake valves.

10. The combustion system of claim 1 wherein each of said two flow masks shrouds substantially half of the head circumference of its respective one of said two intake valves.

11. A combustion system for a four-stroke internal combustion engine having at least one cylinder and a piston which reciprocates therein, comprising:

two substantially identically sized poppet type intake valves actuated in unison to thereby admit combustion air into the one cylinder, a cylinder head portion for (a) closing an end of the one cylinder, (b) guiding a stem portion of each of said two intake valves in a direction of valve opening and closing travel substantially parallel to the direction of the geometric axis of the one cylinder and (c) supporting an individual seating surface for a head portion of each of said two intake valves to seal against in a closed position which maintains gaseous pressure on the piston during compression and power strokes of the piston in the one cylinder, said two intake valve seats being located substantially adjacent each other in said cylinder head, and a combustion chamber enclosed by (a) a top surface of the piston while at its top dead center position in the cylinder and (b) the boundary surfaces formed in said cylinder head by a volume recessed into a flat surface of said cylinder head, said flat surface being used to seal said cylinder head to an associated cylinder block portion of the engine to thereby seal the volume contained jointly within said combustion chamber and the cylinder during compression and power strokes of the piston, at least a majority of the maximum lift of said two intake valves being contained completely within said recessed volume, said recessed volume being formed in the vicinity of said two intake valves by a flow mask portion which closely shrouds substantially half of the circumference of the head portion of each of said two intake valves to thereby wrap from a central point of symmetry for the mask portion in one direction of rotation around the head of one of said intake valves and in the other direction of rotation around the head of the other of said two intake valves, said central point being located substantially on a straight line intersecting the geometric centers of the faces of both of said intake valves and said straight line being normal to a line from said point of symmetry to the geometric axis of the cylinder, whereby opening of said two intake valves in unison directs intake gas flow in a direction facing away from said flow mask and generally across said combustion chamber to thus generate barrel swirl in the cylinder.

12. The combustion system of claim 11 wherein said maximum lift of said two intake valves is contained completely within said recessed volume.

13. The combustion system of claim 12 wherein each of said two-valve head portions has an outer circumference which overlaps area outside the bore of the one cylinder when all three of said circumferences are generated as projections onto a plane normal to the geometric axis of the cylinder, said overlapping area of each of said intake valve heads being less than half of its total circumference area.

14. The combustion system of claim 11 wherein a barrel stratified charge mode of operation of the engine is made available by features of the combustion system comprising:

means for metering fuel individually into combustion air supplied separately through said two intake valves and in so doing for selectively providing a richer air-fuel ratio in a first of two barrel swirl layers supplied separately to the one cylinder by said two intake valves, and a spark ignition source offset from said plane of symmetry into said first barrel swirl layer.

15. The combustion system of claim 14, further comprising VVA means for actuating said two intake valves always in unison, said VVA means being operative to utilize variable lift and timing of said two intake valves to thereby make a throttle valve unnecessary for regulating brake torque produced by the engine, whereby said barrel swirl generated by said flow mask portion of said recessed volume enhances said barrel stratified engine operation at lower engine power levels.

16. A combustion system for a four-stroke internal combustion engine having at least one cylinder and a piston which reciprocates therein, comprising:

two substantially identically sized poppet type intake valves actuated in unison to thereby admit combustion air into the one cylinder, a cylinder head portion for (a) closing an end of the one cylinder, (b) guiding a stem portion of each of said two intake valves in a direction of valve opening and closing travel within fifteen degrees of being parallel to the direction of the geometric axis of the one cylinder and (c) supporting an individual seating surface for a head portion of each of said two intake valves to seal against in a closed position which maintains gaseous pressure on the piston during compression and power strokes of the piston in the one cylinder, said two intake valve seats being located substantially adjacent each other in said cylinder head, an individual passage for supplying combustion air to each of said two intake valves, the combination of one of said intake valves and its associated one of said intake passages being substantially mirror-image symmetric with a combination of the other of said intake valves and the other of said intake passages, said symmetry being with respect to a plane which passes through the geometric axis of the one engine cylinder, each one of said two valve head portions having an outer circumference which extends outside a projection of the bore of the one-cylinder when said one valve head attains its maximum valve lift for all operating conditions of the engine, whereby each of said two intake valves opens into an associated relief volume, and each of said two relief volumes being contoured to comprise at least a portion of a flow mask shrouding its respective one of said intake valves, said two masks together functioning in conjunction with simultaneous opening of said two intake valves to direct combustion air generally across the bore of the one cylinder from said valves and parallel to said plane of symmetry to thereby generate barrel swirl in two symmetric layers of combustion air, one supplied from each of said two intake passages during an intake stroke of the piston, whereby said relief volumes allow location of said head portions of said two intake valves in positions which liberate space in said combustion chamber directly over the bore area of the one cylinder.

17. The combustion system of claim 16 wherein a barrel stratified charge mode of operation of the engine is made available by features of the combustion system comprising:

means for metering fuel individually into combustion air supplied separately through said two intake passages and in so doing for selectively providing a richer air-fuel ratio in a first of said two barrel swirl layers than in a second of said two barrel swirl layers, and a spark ignition source offset from said plane of symmetry into said first barrel swirl layer.

18. The combustion system of claim 16 wherein said direction of opening and closing travel of each of said two intake valves is substantially parallel to the direction of the geometric axis of the one cylinder.

19. A combustion system for a four-stroke internal combustion engine having at least one cylinder and a piston which reciprocates therein, comprising:

at least one poppet type intake valve each of which serves said one cylinder, a cylinder head portion for (a) closing an end of the one cylinder to thereby form a combustion chamber contained between said cylinder head and the piston when at its top dead center position, (b) guiding a stem portion of each of said at least one intake valve in a direction of valve opening and closing travel within ten degrees of being parallel to the direction of the geometric axis of the one cylinder and (c) supporting an individual seating surface for a head portion of each of said at least one intake valve to seal against in a closed position which maintains gaseous pressure on the piston during compression and power strokes of the piston in the one cylinder, a masking portion of said combustion chamber which (a) always shrouds at least twenty percent of the combined head circumference length of all of said at least one intake valve, (b) provides an overall masking configuration which is substantially symmetric with respect to a plane that passes through the geometric axis of the one cylinder, (c) contributes all of its surface area to boundary surface area of said combustion chamber, and (d) provides relief for one or more of said at least one intake valve to open into volume protruding outside a projection of the engine cylinder, whereby said masking portion generates barrel swirl in the engine cylinder at the end of the intake stroke of the piston and said intake valve relief allows location of said at least one intake valve to thereby liberate space in said combustion chamber directly over the bore area of the one engine cylinder.

20. The combustion system of claim 19 wherein the engine is a barrel stratified charge engine.

21. The combustion system of claim 19 further comprising a throttleless variable valve actuation system.

22. The combustion system of claim 21 wherein the engine is a barrel stratified charge engine.

23. The combustion system of claim 19 wherein said masking portion always shrouds at least one-third of the combined head circumference length of all of said at least one intake valve.

24. The combustion system of claim 23 wherein the engine is a barrel stratified charge engine.

25. The combustion system of claim 23 wherein said direction of valve opening and closing travel is substantially parallel to the direction of the geometric axis of the one cylinder.

26. The combustion system of claim 25 wherein the engine is a barrel stratified charge engine.

27. The combustion system of claim 19 wherein said direction of valve opening and closing travel is substantially parallel to the direction of the geometric axis of the one cylinder.

* * * * *